May 20, 1958  M. V. DADD  2,835,236
VALVE ROTATOR
Filed March 16, 1954  2 Sheets-Sheet 1
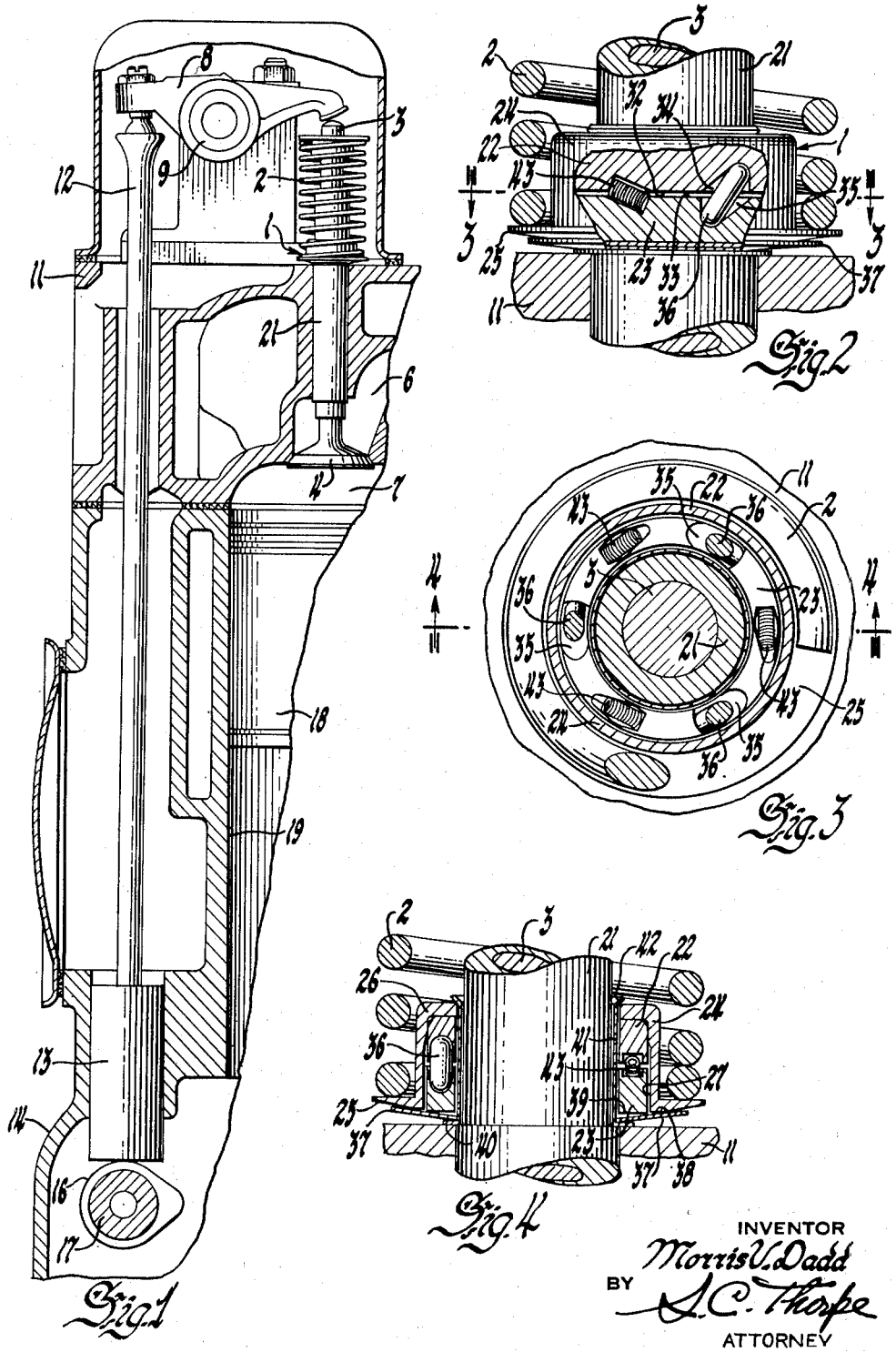
INVENTOR
Morris V. Dadd
BY
J. C. Thorpe
ATTORNEY May 20, 1958  M. V. DADD  2,835,236
VALVE ROTATOR
Filed March 16, 1954  2 Sheets-Sheet 2

INVENTOR
Morris V. Dadd
BY S. C. Thorpe
ATTORNEY

United States Patent Office 2,835,236
Patented May 20, 1958

2,835,236

VALVE ROTATOR

Morris V. Dadd, Grand Rapids, Mich., assignor to General Motors Corporation, Detroit, Mich., a corporation of Delaware Application March 16, 1954, Serial No. 416,529

8 Claims. (Cl. 123—90)

This invention relates to reciprocating elements such as internal combustion engine poppet valves, and particularly to means for inducing concurrent rotation thereof and employing a radially deflectible resilient member such as a Belleville spring responsive to the axial thrust imposed on the reciprocated element and acting as a brake for limiting the rotation to a single direction.

Prior rotator devices of this general type have heretofore been proposed in which the Belleville spring deflects under increasing thrust load to transmit the thrust between a rotatable part such as a valve return spring retainer rotatably fixed to the valve and a non-rotatable part such as the valve guide through balls arranged to roll in inclined recesses machined or otherwise formed in one of said parts. I have found that the durability and operating dependableness of such devices can be substantially improved by substituting cam elements for the previously used balls, each having one portion pivotally or rockably engaging one of said parts and an oppositely disposed end portion which is offset circumferentially of the Belleville spring axis and acts under increased thrust to rotatively cam the parts relative to each other. More simply formed recesses, not requiring inclined bottom walls, may be provided to socket the cam elements for rocking movement only, thereby reducing the cost of manufacture.

It is, therefore, the object of this invention to simplify the manufacture and improve the operating characteristics of prior rotators of this type, and the means by which such has been accomplished will be more clearly understood from the following description of two preferred embodiments selected as illustrative, having reference to the drawings, wherein:

Figure 1 is a fragmentary view of an internal combustion engine valve operating mechanism with one form of my rotator installed between the valve return spring and the engine cylinder head.

Figure 2 is an enlarged fragmentary view similar to Figure 1, with parts broken away and in section to show details of the rotator.

Figure 3 is a sectional view taken substantially on line 3—3 of Figure 2.

Figure 4 is a sectional view taken substantially on line 4—4 of Figure 3.

Figure 5:
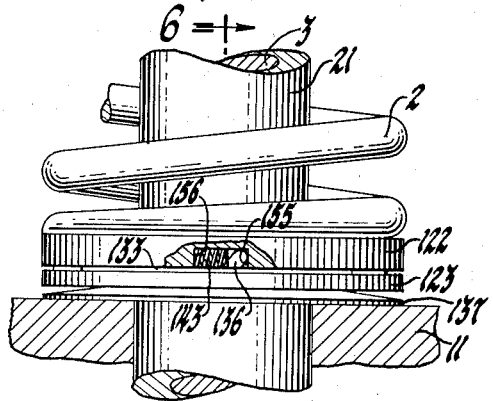
Figures 5 and 6 are views similar to Figures 2 and 4 respectively, but showing a modified form of the rotator.

Referring now in detail to the drawings, the rotator designated generally by the numeral 1 is shown in Figure 1 as inserted under the lower or dead end of the valve return spring 2 whose opposite end is suitably fixed to rotate and reciprocate with the stem 3 of the engine poppet valve 4. While the poppet valve 4 may of course be reciprocated in any desired manner to control the opening of the valve port 6 to the engine combustion chamber 7, I have illustrated this being accomplished by a rocker 8 mounted for oscillation on a shaft 9 suitably supported on the engine cylinder head 11 with opposite ends of the rocker respectively engaging the upper ends of the valve stem 3 and a push rod 12 whose lower end engages a valve tappet 13 slidably mounted in the engine crankcase 14 and riding on a cam 16 of a camshaft 17 which is suitably journalled and is driven by any conventional means (not shown) in timed relation with the reciprocation of the engine piston 18 in the cylinder bore 19. The usual bushing 21, fixed in the cylinder head 11, guides the valve stem during its rotation and reciprocation.

Referring now particularly to Figures 2-4, the rotator 1 includes a pair of relatively rotatable members 22 and 23 shown as being annular in form and concentrically encircling the valve guide bushing 21 above the top of the cylinder head 11. Rigid with the upper member 22, as by a press fit with the external periphery thereof, is an annular housing 24 which extends downward to enclose the lower member 23 and has outwardly and inwardly extending flanges 25 and 26 which form a seat for the lower end of the valve return spring 2 and overlie the upper end of the member 22, respectively. Because of the thrust and resulting frictional engagement between the flange 25 and the lowermost convolution of the valve return spring, no relative rotation between the parts 2, 22, 24 occurs in operation. The internal periphery of the housing 24 is axially recessed at 27 to telescopically receive the lower member 23.

The opposing or axially adjacent end surfaces 32 and 33 of the members 22 and 23 are provided with a plurality of circumferentially spaced and elongated pockets or recesses 34 and 35, respectively, in which are rockably seated the oppositely disposed ends of elongated cam elements in the form of pins 36. In their normal (valve 4 closed) positions shown, these pins 36 are inclined at a relatively small angle to the valve stem axis, and the recessed surfaces 32 and 33 are spaced axially of each other. Each of the recesses 34 and 35 are formed with sufficient clearance between their circumferentially terminating end walls to permit the pins to rock freely to more inclined positions therein in response to movement of the upper and lower members toward each other, which movement together with the concurrent rocking movement of the pins imparts relative rotation between the upper and lower members 22, 23 and is limited only by the recessed surfaces 32, 33 coming into abutment with each other.

Opposite the lower end of the member 22 and the flange 25 is a resilient means in the form of a Belleville spring washer 37 which serves to transmit the thrust of the valve return spring 2 to and from one or the other of these members and the cylinder head 11. For this purpose, the annular bottom face 38 of the housing flange 25 and the annular bottom face 39 of the lower member 23 are made flat, that is, non-helical in relation to the valve stem axis, for uniform clutching engagement with the upper surface of the Belleville. Due to the substantial difference in the mean radial distances of these clutch surfaces 38, 39 from the valve stem axis a variation in their engagement pressure with the upper face of the Belleville occurs as the Belleville deflects radially in response to increasing and decreasing thrust loads transmitted to it by the members 22 and 23.

As best shown in Figures 2 and 4 the Belleville spring has an upwardly presenting dish shape under the thrust load occurring when the engine valve is in its closed position. The inner marginal edge portion of the Belleville seats on the flange 40 at the lower end of a sleeve 41 which extends axially through the members 22 and 23 and has its upper end 42 spun or flared outwardly over the upper surface of the housing upper flange 26 to loosely retain the parts assembled for installation and removal as a unit. The flange 40 on this sleeve also serves as a spacer between the Belleville spring and the cylinder head, thus isolating the Belleville and cylinder head from relative wear between them and insuring a uniform flat seating surface for the Belleville free from any casting defects or irregularities on the upper surface of the cylinder head.

Interposed between the respective members 22, 23 and seating in suitable oppositely presenting inclined pockets formed in the surfaces 32, 33 thereof are a plurality of compression springs 43 which bias the members 22 and 23 rotatively of each other about the valve stem axis in a direction tending to rock the pins 36 toward less inclined positions and to move the upper member towards the valve spring 2 and the lower member 23 towards the Belleville spring 37.

In operation, as the poppet valve 4 is moved downwardly from its position shown in Figure 1 towards its open position, compressing the valve return spring 2, the increased thrust of the return spring 2 is transmitted through the housing 24 by its flange 25 against the Belleville spring 37. This increased thrust load on the Belleville spring results in its radial deflection from the dished shape shown to a flattened or oppositely dished shape, the inner marginal portion thereof pivoting on the spacer flange 40. Due to the fact that the outer periphery of the Belleville moves axially at a greater rate than its portions inwardly thereof during such flexure, the pressure of engagement between the upper surface of the Belleville and the flange surface 38 tends to decrease more rapidly than the engaging pressure between the lower member surface 39 and the Belleville, with the result that the valve return spring thrust load is transmitted to the Belleville through the housing 24, upper member 22, pins 36 and lower member 23, which in turn permits the upper member 22 to rotate about the axis of the valve stem on the pins 36 while the lower member 23 is held against such rotation by its frictional engagement with the Belleville spring. By reason of the valve return spring being frictionally coupled to the upper member flange 25 and also being operatively fixed to the valve stem, such rotation of the upper member produces a simultaneous rotation of the valve during the valve opening movement. Such relative rotation of the members 22 and 23 is yieldingly opposed by the spring means 43.

Upon the poppet valve reaching its maximum open position, the upper member will thus have rotated a sufficient amount to then or immediately thereafter regain its clutching engagement with the Belleville spring, preparatory to the return or closing stroke of the valve. During such return stroke, as the valve spring thrust is relieved and the Belleville returns to its initially dished condition the portion of the Belleville engaged by the flange surface 38 moves upwardly at a greater rate than the Belleville portion opposite the surface 39 of the lower member, and as a result the frictional engagement between this surface 39 and the Belleville is decreased sufficiently for the lower member 23 to be rotatively indexed to its initial position relative to the upper member 22 by the springs 43. As will be appreciated, this rotation of the lower member likewise causes the pins 36 to rock to their originally inclined positions without inducing retrograde rotation of the valve return spring 2 or the valve 4. During each succeeding valve opening and closing strokes the same relative movements of the parts take place whereby a progressive intermittent uni-directional rotation of the valve is accomplished.

Figure 6:
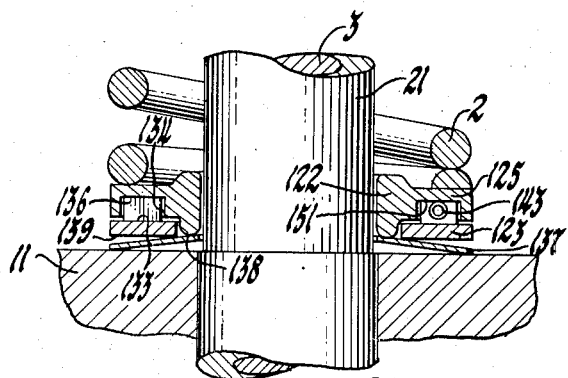
Figure 7:
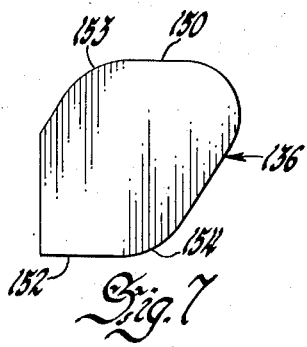
Figure 7 is an enlarged view of one of the cam elements as shown in Figure 5.

The modification of the invention illustrated in the Figures 5–7 differs principally from that previously described in that the upper member 122 has its valve spring seating flange 125 formed integrally therewith, and cam elements 136 are used which are recessed only in the lower surface of this flange and ratchet as pawls on the lower member 123 which is arranged below such flange. Also, the lower member telescopically embraces the lowermost portion of the upper member 122 and, as a result, the Belleville clutching surface 138 at the bottom of the upper member is disposed inwardly of the clutching surface 139 of the lower member relative to the valve stem axis. To provide for the valve stem 3 to rotate during the valve opening movements, the Belleville spring 137 is oppositely dished in its normal condition from that of the previously described Belleville 37.

As shown, the cam elements 136 are in the form of generally trapezoidal shaped rollers of substantial length, each having an upper portion 150 rockably seated against the bottom wall 151 of its recess 134 in the upper member 122 and an oppositely disposed lower portion or lobe 152 normally extending out of the recess and rockably engaging the upper or recess facing surface 133 of the lower member 123. By reason of the upper and lower portions 150 and 152 of these cam elements being relieved opposite each other at 153 and 154, their effective thrust engagements with the upper and lower members 122 and 123 are offset from each other circumferentially of the Belleville spring axis, resulting in each cam element rolling or rocking from one end wall 155 of its recess toward the opposite end wall 156 thereof as increased thrust is applied by the valve spring 2. Interposed between each cam element and its recess end wall 156 is a coil compression spring 143 tending to oppose such rolling movement and acting to return the cam element to its initial position when the increased thrust is relieved.

The operation of this form of my rotator is essentially the same as that previously described, except that by reason of the Belleville spring 137 being oppositely dished the inner marginal portion thereof which is clutchably engaged with the surface 138 of the upper member will move axially of the valve stem at a greater rate with increased thrust than the portion of the Belleville which is engageable with the more radially outer clutch surface 139 of the lower member. The same effect, however, occurs during such flexure of the Belleville under increasing thrust loads of the engine valve spring, of causing the Belleville spring to release the upper member for rotation about the valve stem while transmitting the thrust load through the cam elements and the lower member to the Belleville and maintaining sufficient pressure on the lower member clutch surface 139 to restrain the lower member from rotating. Similarly, during the return stroke of the valve, the more rapid axial displacement of the Belleville inner marginal portion relative to its axial movement opposite the lower member clutch surface 139 causes the upper member to be restrained from retrograde rotation while accommodating return of the cam elements to their initial positions by slidably ratcheting on the lower member upper surface 133 under force of the springs 143.

It will be appreciated that while only two specific embodiments have been shown and described for purposes of illustrating the invention, obviously minor changes and rearrangements of the various parts, such as oppositely dishing the Belleville spring to effect valve rotation during closing, recessing the lower member 123 instead of the upper member 122, etc., may be made without departing from the spirit and scope of the invention which I now claim.

I claim:

1. A device for insertion in thrust transmitting relation between two parts for inducing relative rotation of the parts about an axis in response to their relative movement toward each other along said axis, comprising a Belleville spring arranged for axial deflection about one of its marginal edges in response to said relative movement of the parts, first and second members opposite one end of the Belleville spring having surfaces in facing relation and other surfaces thrustably engageable with said end of the Belleville spring at relatively different distances laterally of said marginal edge, one of said facing surfaces being provided wtih a plurality of circumferentially spaced recesses, cams rockably seated in said recesses and normally spacing said facing surfaces apart, each said cam having freedom to rock in its recess and having a portion engaging the other of said facing surfaces in circumferentially offset relation to its recess seated portion, whereby during said Belleville spring deflection its thrust is transmitted through the member whose said other surface is laterally nearest said marginal edge and thence through said cams to the other of said members which by reason of the offset relation of the cam portions is caused to rotate relative to the Belleville spring, and resilient means reacting against one of the members and operative to rock the cams to their initial positions when said thrust is relieved.

2. In a device adapted to be inserted in thrust transmitting relation between one end of a poppet valve coaxially operating return spring and the retaining means for said spring to induce progressive rotation of the valve during reciprocation, comprising a Belleville spring, two members movable relatively of each other longitudinally of the Belleville spring axis and having correspondingly facing surfaces engageable endwise with the Belleville spring in laterally disposed relation to each other from one marginal edge of the Belleville spring, and means operatively reacting against each of said members to resiliently oppose movement of one of said members relative to the other toward the Belleville spring and to positively impart rotation of said one member in one direction relative to the other about the axis of the Belleville spring in response to said movement, said means including an element having oppositely disposed portions rockably engaging said members and offset circumferentially of each other about said axis.

3. A device for insertion in thrust transmitting relation between two parts for inducing relative rotation of the parts about an axis in response to their relative movement toward each other along said axis, comprising a Belleville spring arranged for axial deflection about one of its marginal edges in response to said relative movement of the parts, first and second members opposite one end of the Belleville spring having surfaces facing each other and other surfaces engaging said end of the Belleville spring at laterally different distances from said marginal edge thereof, one of said facing surfaces having a plurality of circumferentially spaced recesses, each including an end wall and a bottom wall, cam elements in said recesses, each having a portion rockably seated by said bottom wall and an oppositely disposed portion drivingly engaging the facing surface of said other member in circumferentially offset relation about said axis from said first named portion, said oppositely disposed portion normally extending out of its associated recess and maintaining said members axially spaced apart, and resilient means reacting against said end walls and cam elements in opposition to rocking of said cam elements under increased thrust loads imposed on the Belleville spring.

4. A device for insertion in thrust transmitting relation between two parts for inducing relative rotation of the parts about an axis in response to their relative movement toward each other along said axis, comprising a Belleville spring arranged for axial deflection about one of its marginal edges in response to said relative movement of the parts, first and second members opposite one end of the Belleville spring having surfaces facing each other and other surfaces engaging said end of the Belleville spring at laterally spaced apart distances from said marginal edge thereof, said facing surfaces having oppositely presenting recesses terminating in bottom walls offset circumferentially of each other about said axis, an elongated element having its respective ends seating on the bottom walls of said recesses and having freedom to rock about its seated ends from one inclined position in which said facing surfaces are maintained spaced-apart by said element to a further inclined position in which said facing surfaces are in contact with each other, and resilient means reacting against each of said members in opposition to relative rotation imparted to the members by the rocking of said element to its further inclined position under increased Belleville spring thrust.

5. In a device adapted to be inserted in thrust transmitting relation between one end of a poppet valve coaxially operating return spring and the retaining means for said spring to induce progressive rotation of the valve during reciprocation, comprising a Belleville spring, two members movable relatively of each other longitudinally of the Belleville spring axis and having surfaces engageable endwise with the Belleville spring in laterally disposed relation to each other from one marginal edge of the Belleville spring, and means operatively reacting against each of said members to resiliently oppose movement of one of said members relative to the other toward the Belleville spring and to positively impart rotation of said one member in one direction relative to the other about the axis of the Belleville spring in response to said movement, said means including an element having oppositely disposed portions rockably engaging said members and offset circumferentially of each other about said axis, and a spring interposed between said element and one of said members tending to oppose rocking of said element in the direction of increased offset of said end portions.

6. In a device adapted to be inserted in thrust transmitting relation between one end of a poppet valve coaxially operating return spring and the retaining means for said spring to induce progressive rotation of the valve during reciprocation, comprising a Belleville spring, a sleeve member having a flange at one end forming an abutment for the Belleville spring, a return spring seating member engageable with the Belleville spring at a distance radially thereof from said abutment and having a sleeve portion radially spaced from said sleeve member, said sleeve portion terminating at its end most remote from said sleeve member flange with a flange radially spacing said members apart, said sleeve member having its other end flared to overlie said sleeve portion and thereby retain said members and the Belleville spring in assembled relation, an annular member interposed between said sleeve member and sleeve portion with clearance to rotate and move axially relative to each thereof and engageable with the Belleville spring at a distance radially thereof less than said first mentioned distance from said abutment, and means operatively reacting against each of said seating and annular members to resiliently oppose relative axial movement of the seating member toward the Belleville spring and to impart rotation to the seating member relative to said annular member in response to said last mentioned movement.

7. In a device adapted to be inserted in thrust transmitting relation between one end of a poppet valve coaxially operating return spring and the retaining means for said spring to induce progressive rotation of the valve during reciprocation, comprising a Belleville spring arranged for deflection longitudinally of its axis about one of its marginal edges in response to increasing and decreasing valve return spring thrust, two members having telescopically movable concentric annular portions engageable in alternate thrust transmitting relation with the Belleville spring at different distances radially thereof from said edge, said members having normally spaced apart opposing annular surfaces extending generally transversely of the Belleville spring axis, one of said surfaces having a plurality of circumferentially spaced recesses therein, a cam element seated in each said recess and having freedom to rock about its seat therein circumferentially of said axis, each said cam element having a lobe extending outwardly out of its recess and in a direction circumferentially of said axis into one-way rotary clutching engagement with the other of said surfaces whereby as the Belleville spring deflects under increased thrust load the member whose said annular portion is most remote from said edge is forced to rotate relative to the Belleville spring and said other member by the rocking movement of said cam elements, and spring means acting between said surface recessed member and cam elements to index said lobes to new positions of engagement with said other surface when said increased Belleville spring thrust is relieved.

8. In a device adapted to be inserted in thrust transmitting relation between one end of a poppet valve coaxially operating return spring and the retaining means for said spring to induce progressive rotation of the valve during reciprocation, comprising a Belleville spring, two members movable relatively of each other longitudinally of the Belleville spring axis and having surfaces engageable endwise with the Belleville spring in laterally disposed relation to each other from one marginal edge of the Belleville spring, and means operatively reacting against each of said members to resiliently oppose movement of one of said members relative to the other toward the Belleville spring and to positively impart rotation of said one member relative to the other about the axis of the Belleville spring in response to said movement, said means including a plurality of pins pivotally connected at their respective ends to said members and inclined circumferentially of the Belleville spring axis, and a spring interconnecting and biasing said members rotatively of each other about said axis in the direction tending to reduce the inclination of said pins.

References Cited in the file of this patent
UNITED STATES PATENTS

| | | |
|---|---|---|
| 2,397,502 | Ralston | Apr. 2, 1946 |
| 2,516,795 | Norton | July 25, 1950 |
| 2,582,060 | Newton | Jan. 8, 1952 |
| 2,624,323 | Thorne | Jan. 6, 1953 |